(12) United States Patent  
Hurley

(10) Patent No.: US 6,467,790 B1
(45) Date of Patent: Oct. 22, 2002

(54) RESTRAINT HARNESS

(75) Inventor: Michael R. Hurley, San Diego, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 09/345,200

(22) Filed: Jun. 30, 1999

(51) Int. Cl.⁷ ................................................ B60D 1/00
(52) U.S. Cl. ..................... 280/480; 280/493; 280/801.1
(58) Field of Search ............................... 280/492, 493, 280/480, 801.1, 802, 808

(56) References Cited

U.S. PATENT DOCUMENTS

| | | | | | |
|---|---|---|---|---|---|
| 3,730,557 A | * | 5/1973 | Cox | ............................ | 280/504 |
| 3,829,131 A | * | 8/1974 | Moore, Jr. | ................. | 280/493 |
| 3,955,832 A | * | 5/1976 | Kalmanson | ................. | 280/504 |
| 4,418,936 A | * | 12/1983 | Adams et al. | .............. | 280/493 |
| 4,426,098 A | * | 1/1984 | Kalmanson | ................. | 280/504 |
| 5,076,608 A | * | 12/1991 | Shimose | ..................... | 280/801 |
| 5,129,667 A | * | 7/1992 | Gratton | ..................... | 280/493 |
| 5,967,541 A | * | 10/1999 | Johansen | .................... | 280/504 |

* cited by examiner

Primary Examiner—J. J. Swann
Assistant Examiner—L. Lum
(74) Attorney, Agent, or Firm—Stetina Brunda Garred & Brucker

(57) ABSTRACT

A restraint harness. The restraint harness may include a longitudinal load strap. The longitudinal load strap may include a primary anchor, primary lateral restraint, and secondary lateral restraint affixed thereto. The primary anchor may be provided with a buckle at one end thereof adapted to join the ends of the primary anchor to form a loop. The primary and secondary lateral restraints may further be provided with fasteners at the ends thereof to join the ends of the primary and secondary lateral restraints to form a loop.

33 Claims, 15 Drawing Sheets

(VIEW A-A)

(VIEW B-B)

(VIEW C-C)

(VIEW D-D)

RESTRAINT HARNESS

STATEMENT REGARDING FEDERALLY SPONSORED RESEARCH AND DEVELOPMENT

Certain of the research leading to the present invention was sponsored by the United States government under United States Air Force Contract No. MDA972-95-3-0013. The United States government may have certain rights in this invention.

CROSS-REFERENCE TO RELATED APPLICATIONS

Not applicable.

TECHNICAL FIELD AND INDUSTRIAL APPLICABILITY OF THE INVENTION

The present invention relates to a restraint harness for use on-a tow bar apparatus having tension release mechanism, and more particularly, relates to a tow bar restraint harness for use in maintaining the integrity of an aircraft tow bar apparatus having a shear pin tension release mechanism after pin shear has occurred

DESCRIPTION OF THE INVENTION BACKGROUND

A number of tow bar apparatuses incorporate into their design the use of a tension release mechanism. Such tension release mechanisms serve to relieve the tension being placed on the tow bar apparatus by the load under tow when the tension exceeds a predetermined threshold. This threshold is typically set to provide for the release of any tension being exerted on the tow bar apparatus by the load under tow before the tension reaches a level at which it may cause damage to the tow bar apparatus, the tow vehicle, and/or the load under tow. For example, in the case of a typical vehicle tow bar apparatus, the tension release mechanism is calibrated to provide for the release of tension before any damage can occur to the vehicle under tow.

The tension release mechanism of a vehicle tow bar apparatus typically includes a shear pin tension release mechanism. In a shear pin tension release mechanism of a vehicle tow bar, a shear pin is typically used to join two sections of the tow bar apparatus. The shear pin is positioned such that the tension exerted on either of the two sections of the tow bar apparatus connected by the shear pin is born by the shear pin. If the tension forces exerted on either of the two sections of the tow bar apparatus exceeds the shear strength of the shear pin, the tension forces will act to shear the shear pin. When pin shear occurs, the two sections of the tow bar apparatus formerly connected by the shear pin will be disconnected. Accordingly, by providing a shear pin that is designed to shear before the tension forces on the tow bar apparatus reach a level at which damage to the tow bar apparatus, tow vehicle, and/or vehicle under tow would occur, the use of a shear pin tension release mechanism serves the valuable purpose of releasing the attached portions of the tow bar before any damage can occur.

While the shearing of the shear pin serves to release the tension on the tow bar apparatus, it also serves to disconnect the vehicle under tow from the tow vehicle. If the vehicle under tow is manned by an operator when pin shear occurs, the operator may bring the vehicle to a stop. However, a difficulty may arise when the vehicle under tow is unmanned. In such case, when pin shear occurs, the vehicle formerly under tow is placed into a free rolling condition without a means to bring it to a safe stop. Absent any remotely controlled braking or guidance systems on board the vehicle formerly under tow, the vehicle must generally be allowed to roll out of control until natural forces bring it to a stop. It will be appreciated that such natural forces may often include obstacles or individuals that lie in the path of the vehicle.

While many vehicles include the capacity to be manned by an operator during towing operations, many other vehicles do not. One such vehicle is an unmanned or drone aircraft, also known as an unmanned aerial vehicle or UAV. In the course of operating a UAV, it is often necessary to tow the UAV from one location to another. Such towing is traditionally accomplished through the use of an aircraft tow bar apparatus having a shear pin tension release mechanism. Such a tow bar apparatus is typically connected to the nose landing gear of the UAV. The shear pin tension release mechanism on the tow bar is thus designed to release the section of the tow bar that is attached to the UAV upon encountering unacceptable tension forces in the tow bar apparatus. For example, before the tension forces on the aircraft tow bar apparatus reach a level at which the nose landing gear of the UAV would be damaged, the shear pin is designed to shear. When pin shear occurs, the UAV is placed in a free rolling condition with the forces of nature being the only means available to bring the UAV to a stop. Such a condition is undesirable and can result in damage to the UAV, damage to other property, or, worse yet, injury to personnel in the path of the UAV.

Accordingly, it would be advantageous to provide an apparatus that maintains the integrity of the connection between an aircraft tow bar apparatus having a shear pin tension release mechanism and the nose landing gear of a UAV after pin shear has occurred. Furthermore, it would be advantageous that such an apparatus maintain the integrity of this connection in directions both parallel and lateral to the tension being placed on the tow bar, so that the UAV under tow may be safely and orderly maneuvered to a stop after pin shear has occurred using the tow vehicle. More broadly, there exists a need for an apparatus that maintains the integrity of the connection between any vehicle towing device having a tension release mechanism and the vehicle under tow after the tension release mechanism has been triggered so that the vehicle under tow maybe safely and orderly maneuvered to a stop using the tow vehicle.

SUMMARY OF THE INVENTION

In accordance with one form of the present invention, there is provided a restraint harness that includes a longitudinal load strap member. The longitudinal load strap member defines an upper surface, a lower surface, a closed end. A primary anchor is fixedly connected to the upper and lower surfaces adjacent to the open end and a primary lateral restraint is fixedly connected to the upper and lower surfaces adjacent to the closed end. A secondary lateral restraint is fixedly connected to the upper surface between the primary anchor and said primary lateral restraint.

It is a feature of the present invention to maintain the integrity of a tow bar apparatus having a tension release mechanism after the tension release mechanism has been triggered, in directions both parallel and lateral to the tension being placed on the tow bar by the load under tow.

It is another feature of the present invention to maintain a first tow bar portion in attachment with a second tow bar portion that was formerly connected to the first tow bar portion.

It is yet another feature of the present invention to maintain the integrity of an aircraft tow bar apparatus having a shear pin release mechanism after pin shear has occurred, in directions both parallel and lateral to the tension being placed on the tow bar by the aircraft under tow.

Yet another feature of the present invention is to maintain the integrity of an aircraft tow bar apparatus having a shear pin tension release mechanism after pin shear has occurred, to allow control to be maintained over the aircraft under tow until the aircraft can be brought to a stop and the shear pin replaced.

Accordingly, the present invention provides solutions to the shortcomings of prior tow bar apparatuses and arrangements employed to tow a variety of vehicles and apparatuses, including aircraft. Those of ordinary skill in the art will readily appreciate, however, that these and other details, features and advantages will become further apparent as the following detailed description of the preferred embodiments proceeds.

BRIEF DESCRIPTION OF THE DRAWINGS

In the accompanying Figures, there are shown embodiments of the present invention wherein like reference numerals are employed to designate like parts and wherein.

DETAILED DESCRIPTION OF THE PREFERRED EMBODIMENTS

Figure 1:
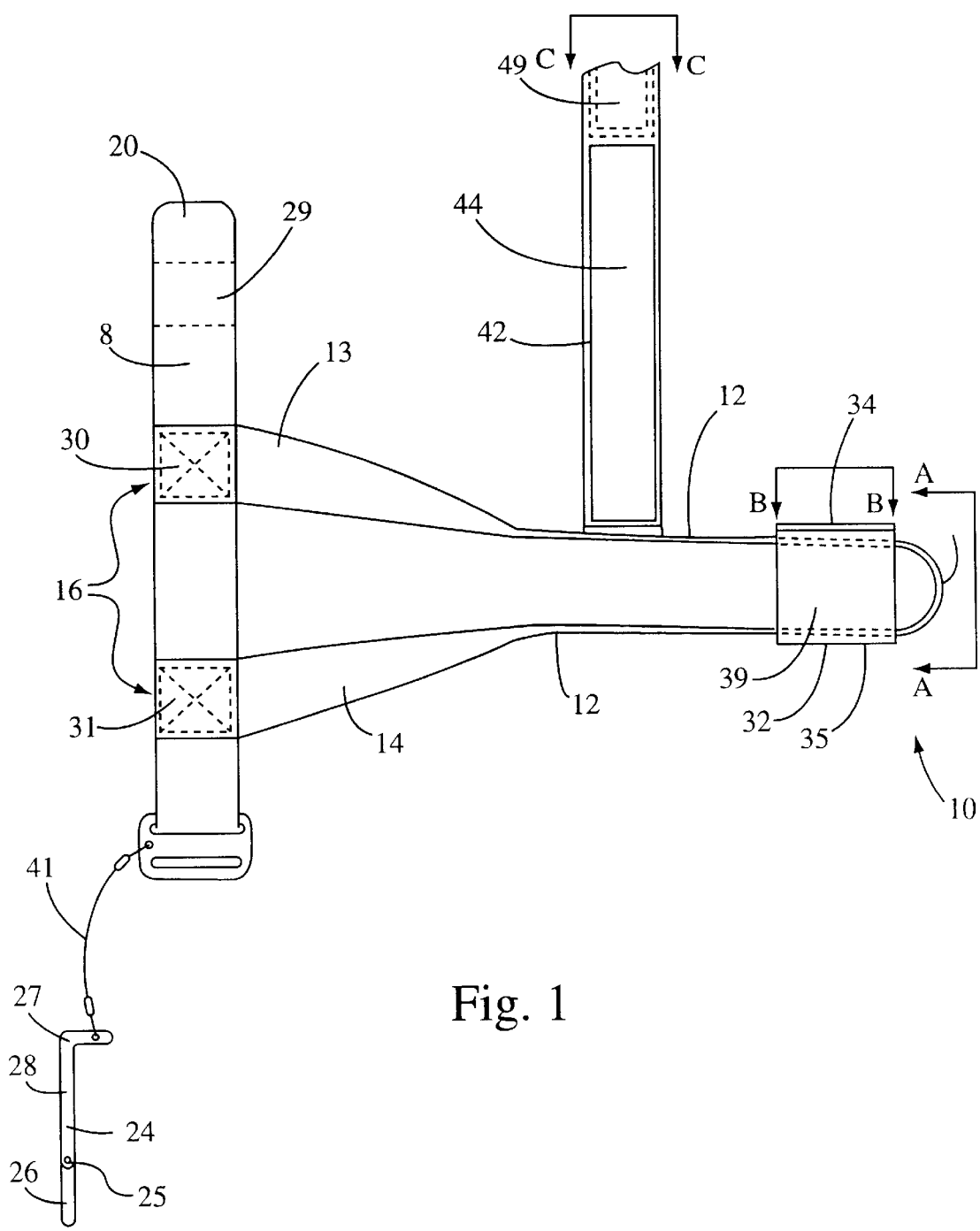
FIG. 1 is a side elevational view of an embodiment of the restraint harness of the present invention in the open position.

Referring now to the drawings for the purpose of illustrating embodiments of the invention only and not for the purposes of limiting the same, the Figures show an embodiment of the present invention 10 adapted for use in connection with an aircraft tow bar apparatus 50 having a shear pin tension release mechanism 70. The subject invention is described herein for use with a towing vehicle 51 and an unmanned aircraft 52 (hereinafter, "UAV"). While the present invention is particularly well-suited for use in connection with an aircraft tow bar apparatus 50 of such design having a shear pin tension release mechanism 70, one of ordinary skill in the art will readily appreciate that the present invention may be successfully employed in connection with various other types of tow bar and load bearing apparatus having various types of tension release mechanisms, such as vehicle tow bar apparatus, watercraft tow bar apparatus, and apparatus for towing various other loads. One of ordinary skill in the art will further appreciate that the protection afforded to the invention claimed herein may not be limited solely to its use in connection with an aircraft tow bar apparatus 50 having a shear pin tension release mechanism 70 of the type depicted in the present Figures.

Figure 2:
FIG. 2 is a top view of the longitudinal load strap of the restraint harness of FIG. 1, shown in isolation.
Figure 3:
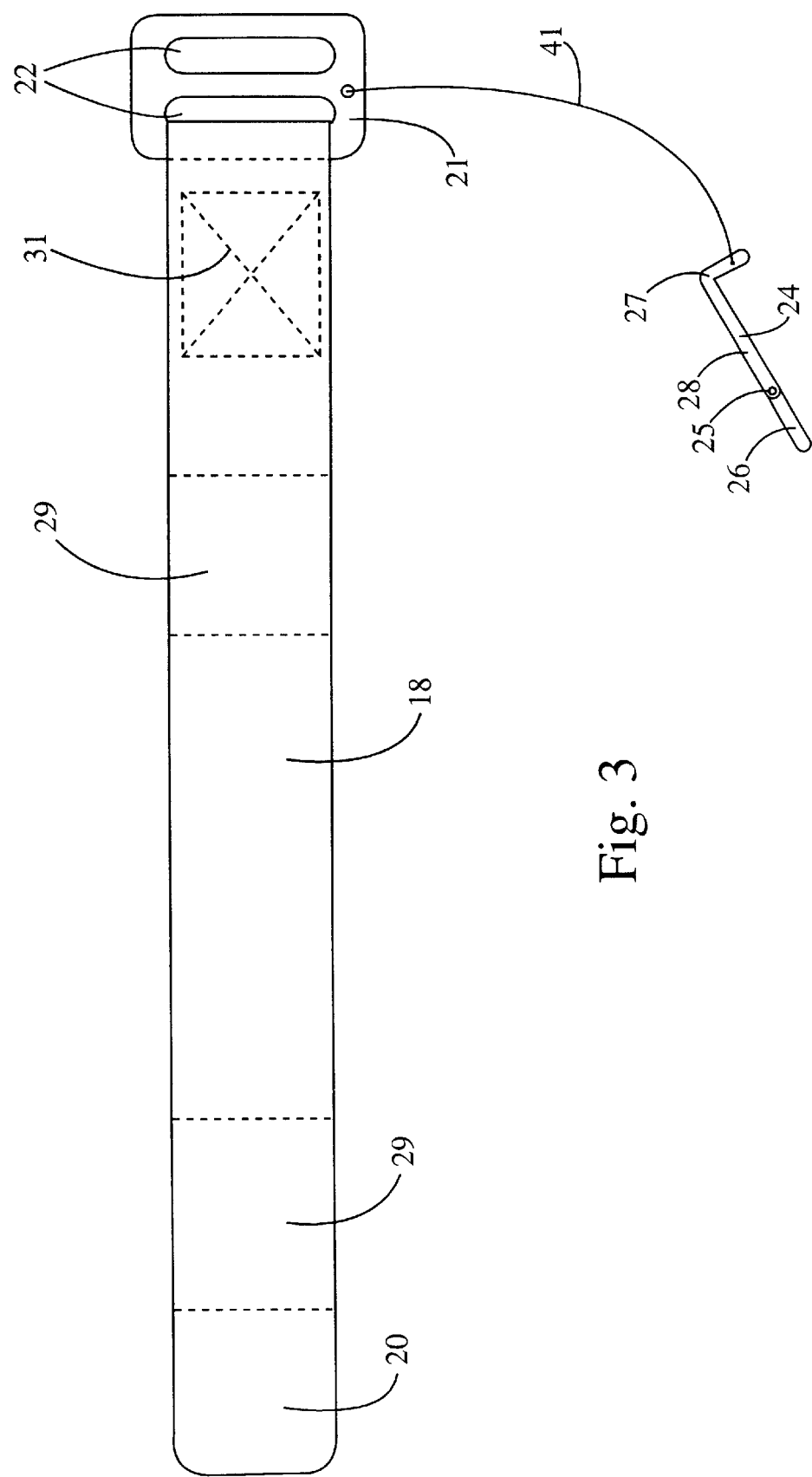
FIG. 3 is a top view of the primary anchor of the restraint harness of FIG. 1, shown in isolation.
Figure 4:
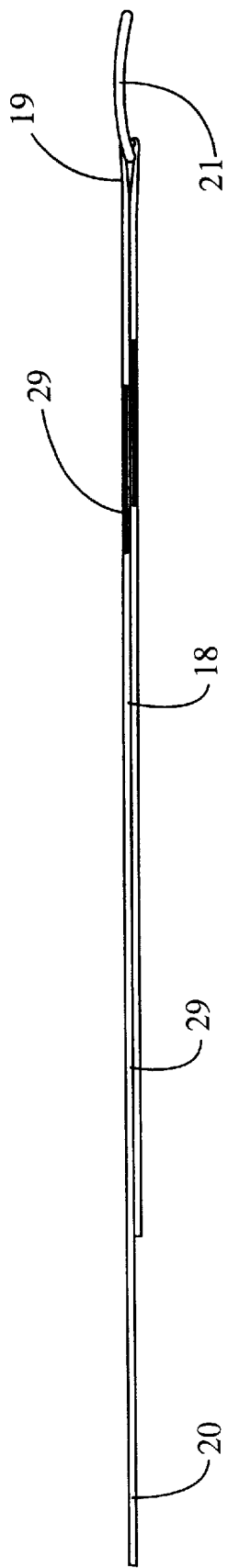
FIG. 4 is a side view of the primary anchor of the restraint harness of FIG. 1, shown in isolation;.
Figure 5:
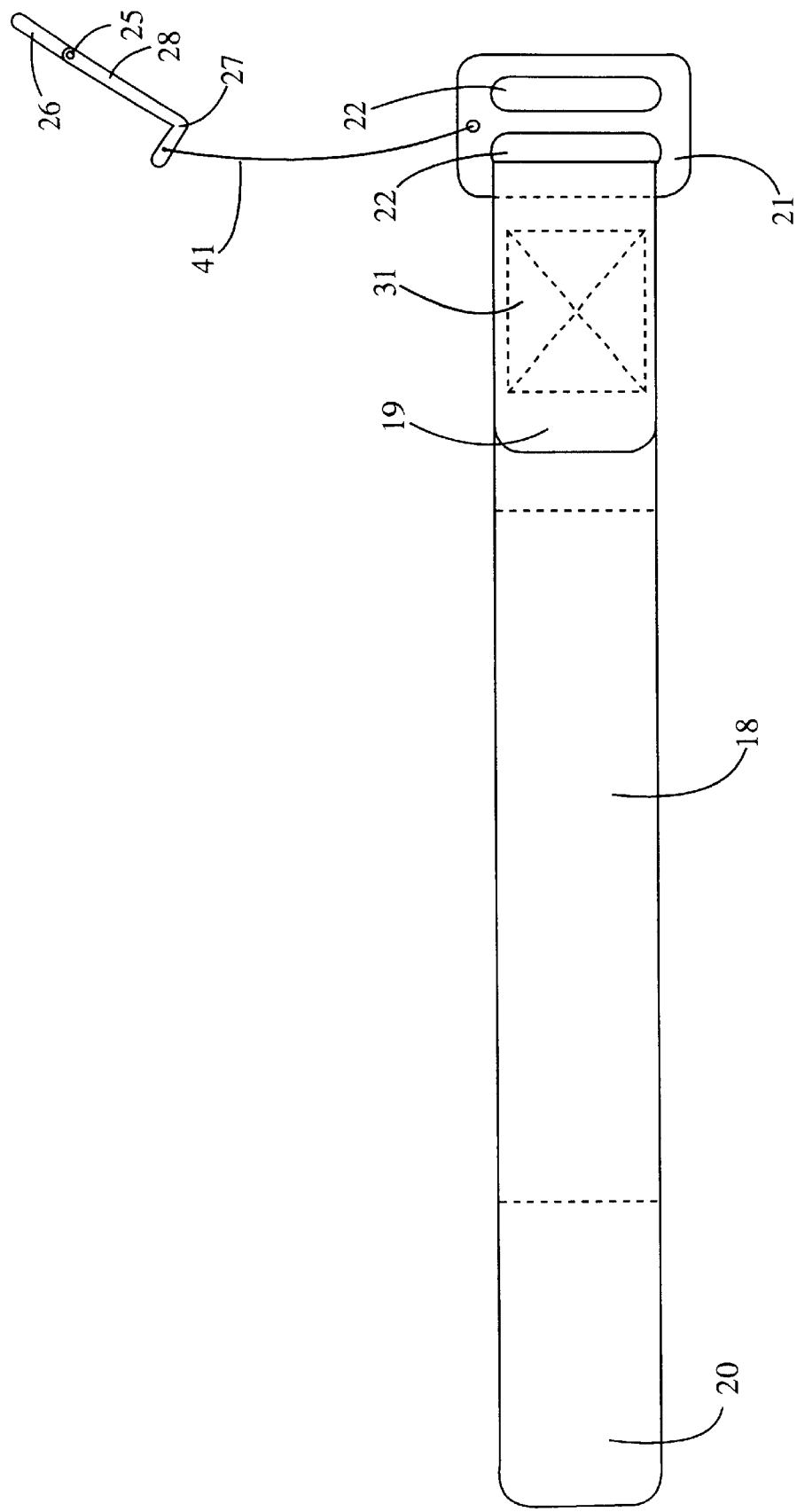
FIG. 5 is a bottom view of the primary anchor of the restraint harness of FIG. 1, shown in isolation.

Because the general mode of operation of an aircraft tow bar apparatus 50 that employs a shear pin tension release mechanism 70 is well known, only those features of the aircraft towing apparatus 50 and shear pin tension release mechanism 70 that are helpful in illustrating the mode of embodiments of the present invention are discussed below. The embodiment of the restraint harness 10 depicted in various aspects in FIGS. 1–13 generally includes a longitudinal load strap 12, a primary anchor 18, a primary lateral restraint 32, and a secondary lateral restraint 42. As shown in FIGS. 1 and 2, the longitudinal load strap 12 includes an elongate strap formed into a "C" shape that includes an upper surface 13 and a lower surface 14, and that defines a closed end portion 15 and an open end portion 16. The longitudinal load strap 12 may be fabricated from a flexible material having a high tensile strength such as polyester. For example, the polyester material from which the longitudinal load strap 12 may be fabricated comprises a 1.625 inch polyester webbing having a breaking strength rated at least 6,500 pounds. However, it will be appreciated by the skilled craftsman that other materials having similar characteristics may be utilized in the design of the longitudinal load strap 12.

The primary anchor 18 includes an elongate flexible strap fabricated from a material such as nylon or the like having one or more slot 29 woven therein. Each slot 29 may be 2 inches in length. In the case that there is more than one slot 29, the slots 29 are spaced from each other by 4 inches. Accordingly, the slots 29 form a repeating pattern every 6 inches. In addition, the nylon material from which the primary anchor 18 may be fabricated from a 1.75 inch slotted nylon webbing having a breaking strength rated at least 6,000 pounds. However, it will be appreciated by the skilled craftsman that other materials having similar characteristics and/or slot configurations may be utilized for the design of the primary anchor 18 As shown in FIG. 1, the primary anchor 18 is fixedly attached at two points 30 and 31, respectively, to the upper and lower surfaces 13 and 14, respectively, of longitudinal load strap 12. In particular, the primary anchor 18 is stitched to the upper and lower surfaces 13 and 14, of the longitudinal load strap 12 adjacent to the open end portion 16. In the embodiment depicted in the Figures, 0.045 inch polyester thread having a tensile strength rated at least 85 pounds was employed. However, the primry anchor 18 may be attached to the longitudinal load strap 12 by other suitable methods such as adhesive or through lamination, etc. such that the primary anchor 18 is oriented perpendicular to the longitudinal load strap 12.

The primary anchor 18 includes ends 19 and 20. End 19 includes buckle 21 affixed thereto. Buckle 21 is commercially available and has at least one aperture 22 therein. In the embodiment depicted in the Figures, buckle 21 was proof load certified at 2,750 pounds. However, other appropriate buckle constructions may be employed. The buckle 21 may be generally affixed to end 19 by passing end 19 through one of the apertures 22 in buckle 21, laying the end 19 over a portion of the primary anchor 18, and the attaching the end 19 to the primary anchor 18 by means of stitching utilizing polyester thread as described above. However, other attachment methods such as adhesive or lamination may be employed. End 20 is generally sized to fit within the apertures 22 of the buckle 21. Accordingly, it will be understood by one of ordinary skill in the art that the end 20 of the primary anchor 18 may be releasably fastened to the buckle 21 by passing the end 20 through at least one of the apertures 22 in the buckle 21. It will further be appreciated that, by releasably fastening the end 20 into the apertures 22 of the buckle 21, the primary anchor 18 may thereby be formed into an adjustable loop.

Figure 6:
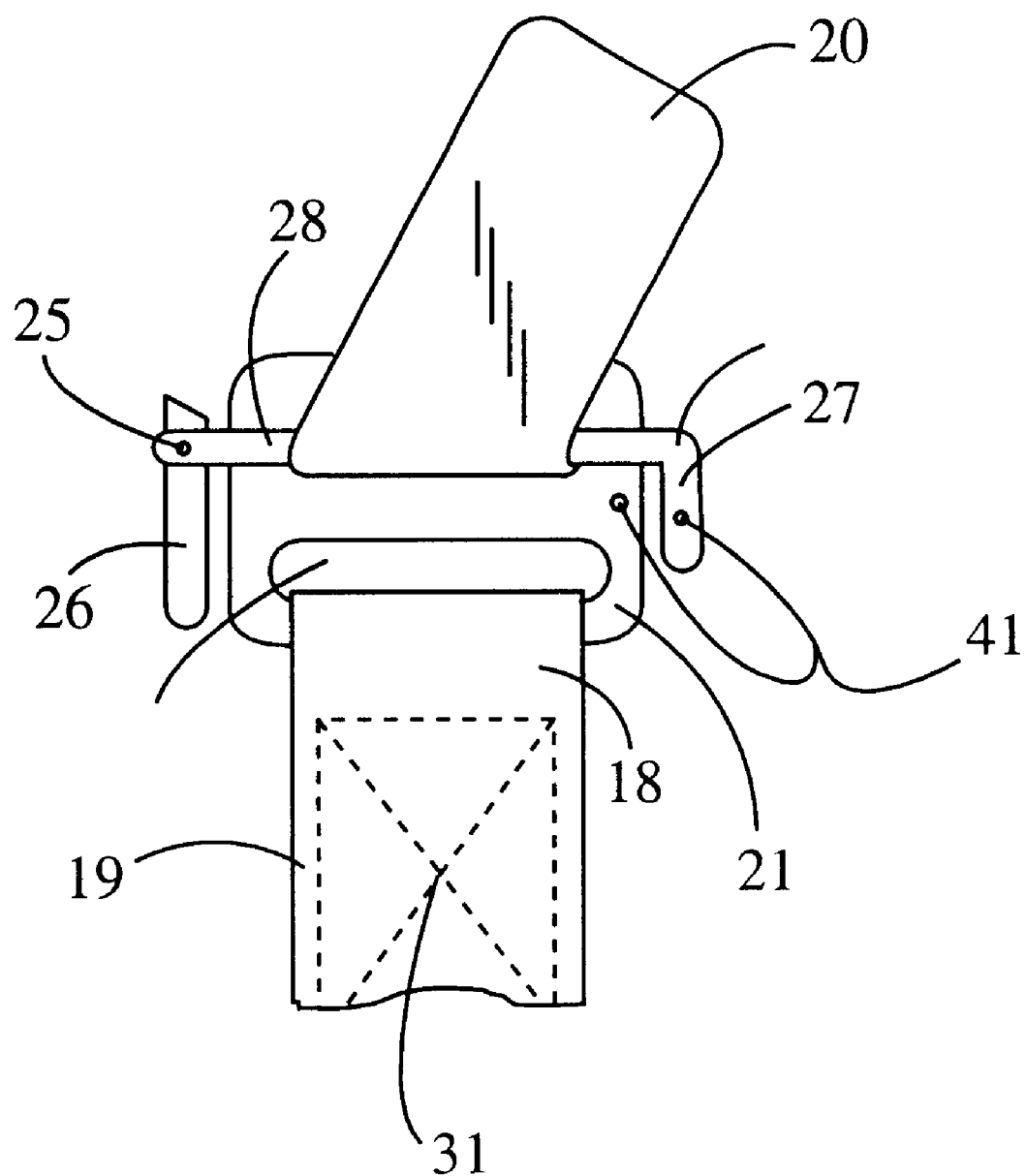
FIG. 6 is a partial side view of the primary anchor of the restraint harness of FIG. 1, shown in isolation, depicting the end of the primary anchor fastened to the buckle thereof.
Figure 7:
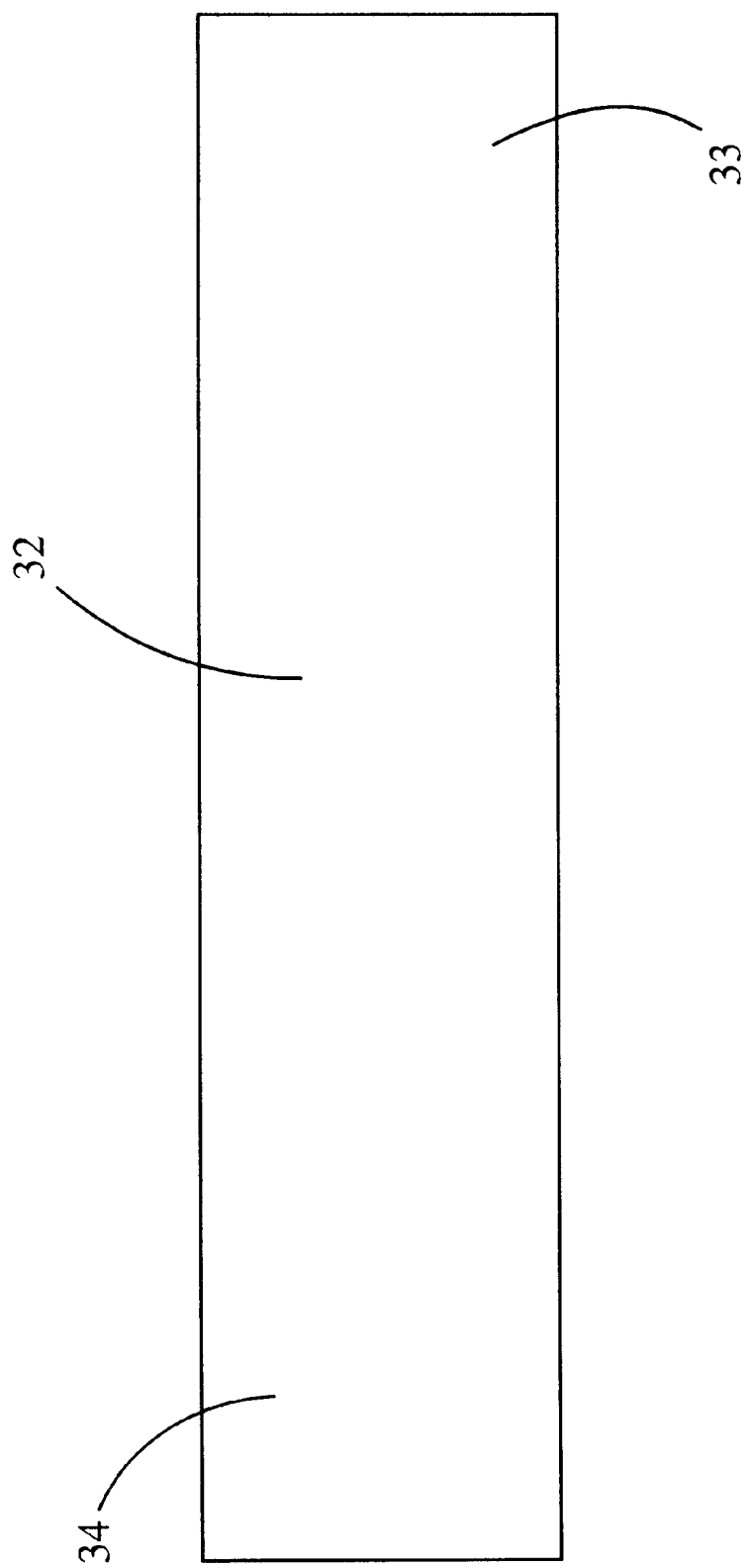
FIG. 7 is a top view of the primary lateral restraint of the restraint harness of FIG. 1, shown in isolation.
Figure 8:
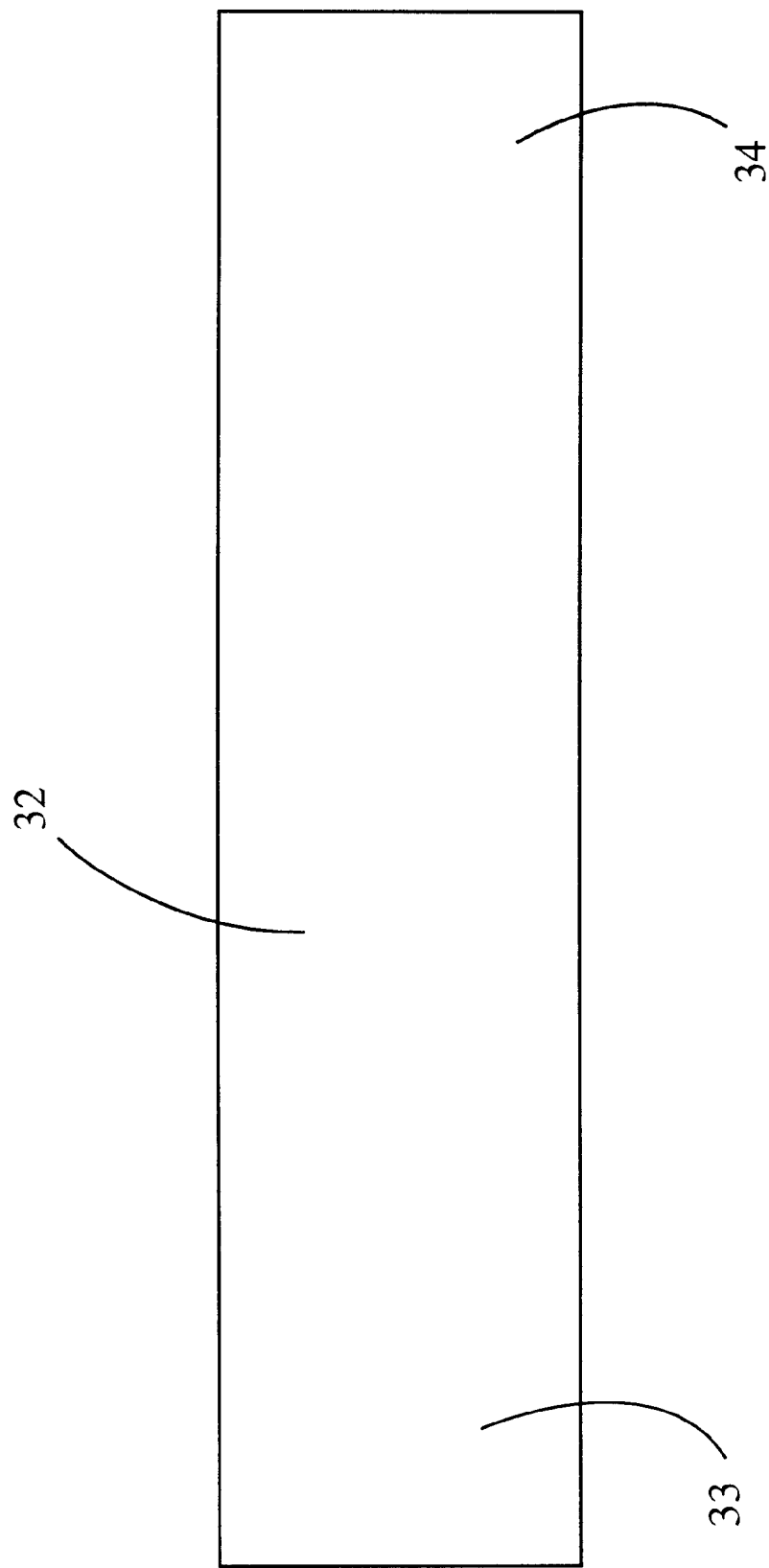
FIG. 8 is a bottom view of the primary lateral restraint of the restraint harness of FIG. 1, shown in isolation.
Figure 19:
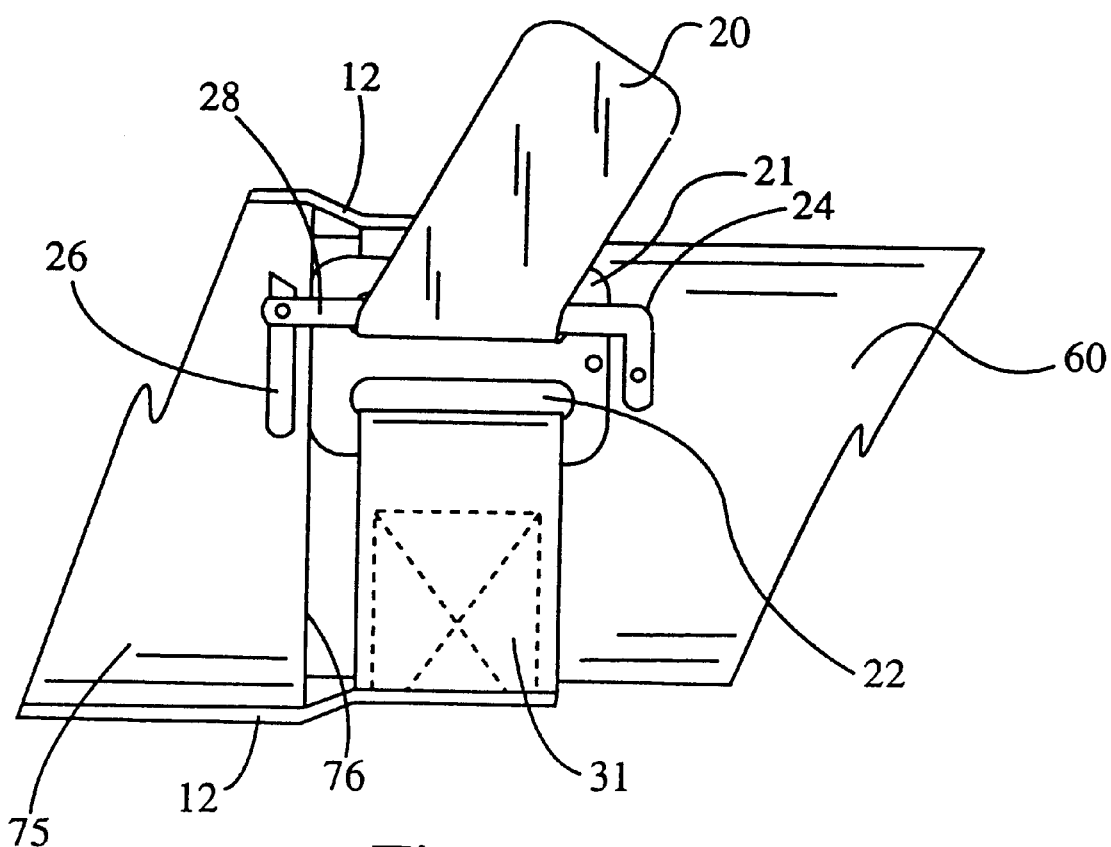
FIG. 19 is a partial side view of the shear-pin release mechanism of the aircraft tow bar apparatus of FIG. 16, having the restraint harness of FIG. 1 installed thereon, taken in the direction indicated by line D—D in FIG. 18.

The buckle 21 may further include a locking pin 24 attached thereto by a tie cable 41. The locking pin 24 generally includes an elongate rod formed from an appropriate rigid material such as plastic, metal, or the like. For example, in applications wherein a UAV 52 is being towed, the corresponding locking pin 24 may be fabricated from metal. The locking pin 24 is preferably "L" shaped and thus defines a main section 28 and an elbow section 27. The main section 28 is sized to fit within the slots 29 provided in the primary anchor 18 and includes a hinged portion that is attached thereto by a hinge 25 located midway along the length thereof. In this embodiment, it is desirable that the main section 28 of the locking pin 24 be longer than the apertures 22 in the buckle 21. As shown in FIGS. 6 and 19, when the end 20 of the primary anchor 18 is passed through one of the apertures 22, as described above, the main section 28 of the locking pin 24 may be inserted through the one or more slot 29 in the primary anchor 18 that lies closest to the aperture 22 through which the end 20 of the primary anchor 18 has been passed such that the hinged portion 26 of the locking pin 24 protrudes fully from the slot 29. Those of ordinary skill in the art will appreciate that the one or more slot 29 in the primary anchor 18 is woven directly from the material that forms the primary anchor 18, as is known in the art. The hinged portion 26 may then be pivoted about the hinge 25 until it is oriented at a substantially perpendicular angle to the main section 28. It will be appreciated by the skilled artisan that, in such an orientation, the locking pin 24 will be restrained from sliding out of the slot 29 by the hinged portion 26 on one end and by the elbow section 27 on the other. It will further be appreciated that, since the length of the locking pin 24 is greater than that of the aperture 22, any force acting to draw the primary anchor 18 back through the aperture 22 will also act to draw the locking pin 24 into contact with the buckle 21 thereby blocking the motion of the primary anchor 18 back through the aperture 22.

Figure 9:
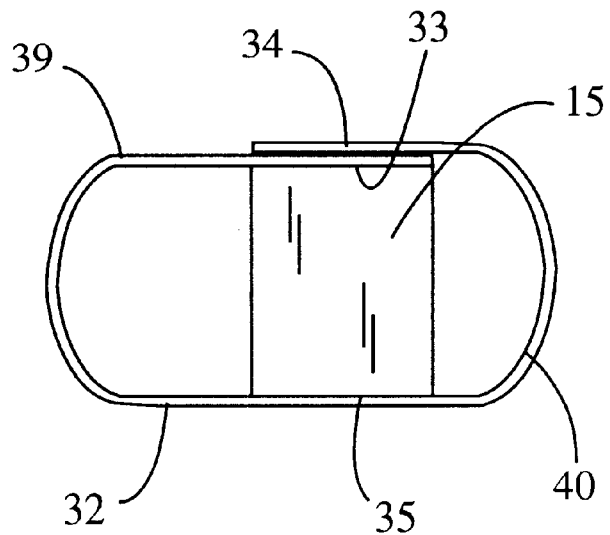
FIG. 9 is a side view of the restraint harness of FIG. 1, taken in the direction indicated by line A—A in FIG. 1.
Figure 10:
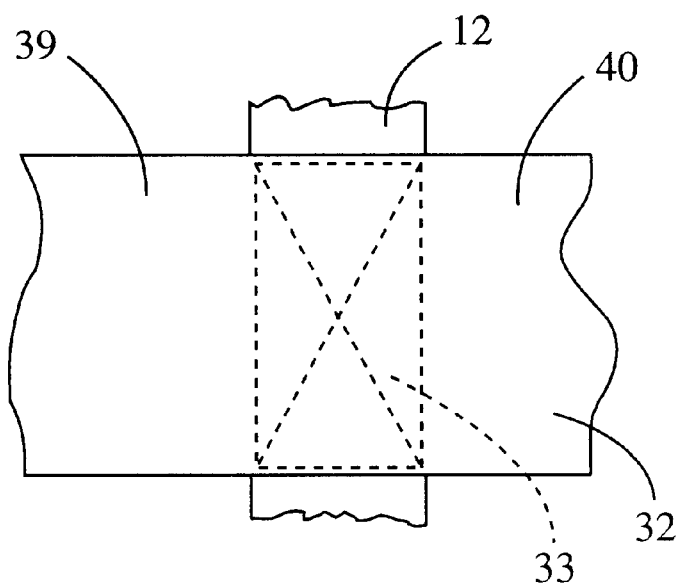
FIG. 10 is a partial top view of the restraint harness of FIG. 1, taken in the direction indicated by line B—B in FIG. 1.
Figure 13:
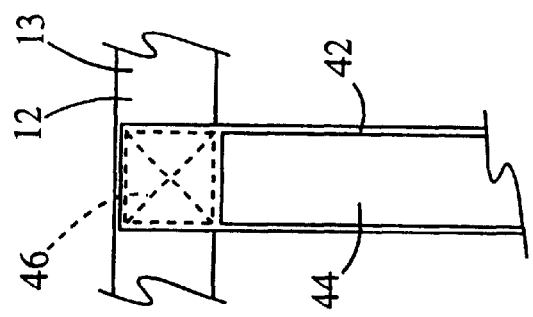
FIG. 13 is a partial side view of the restraint harness of FIG. 1; taken in the direction indicated by line C—C in FIG. 1.
Figure 11:
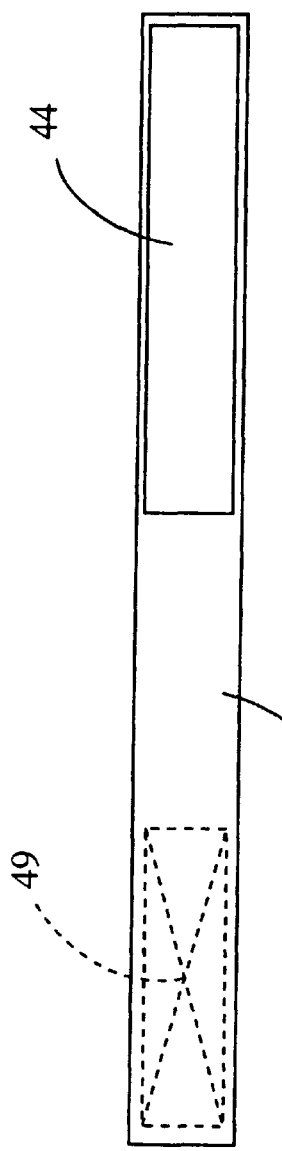
FIG. 11 is a top view of the secondary lateral restraint of the restraint harness of FIG. 1, shown in isolation.
Figure 12:
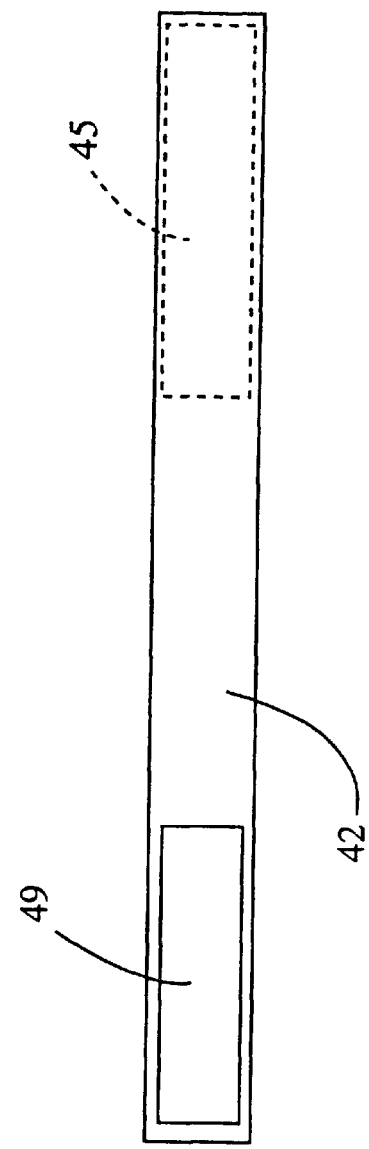
FIG. 12 is a bottom view of the secondary lateral restraint of the restraint harness of FIG. 1, shown in isolation.
Figure 14:
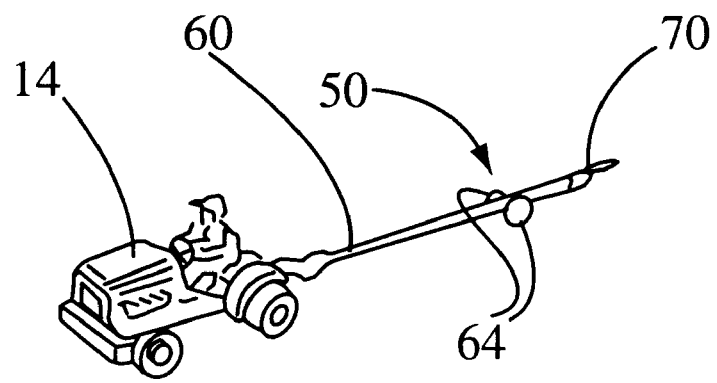
FIG. 14 is an isometric view of a tow vehicle having an aircraft tow bar apparatus attached thereto.

In this embodiment, the primary lateral restraint 32 comprises an elongate flexible strap having ends 33 and 34. The primary lateral restraint 32 may be fabricated from a flexible material such as a polyester. For example, the primary lateral restraint 32 may be fabricated from a 3 inch polyester webbing having a breaking strength rated at least 15,000 pounds. However, it will be appreciated by the skilled craftsman that other materials having similar characteristics may be utilized for the design of the primary lateral restraint 32. As can be seen in FIGS. 1 and 9, the primary lateral restraint 32 is fixedly attached at the ends 33 and 34 to the upper 13 of longitudinal load strap 12 adjacent to the closed end 15, such that the length of the primary lateral restraint 32 is oriented perpendicular to the length of the longitudinal load strap 12. In addition, the primary lateral restraint 32 is anchored at a point 35 along its length to the lower 14 of the longitudinal load strap 12 adjacent to the closed end 15. In particular, the means of attaching the primary lateral restraint 32 to the upper and lower 13 and 14 of the longitudinal load strap 12 may include stitching with polyester thread of the type described above. However, it will be understood by those of ordinary skill in the art that other attachment methods are available. Such methods may include, for example, hook and loop fastener, clips, clamps, snaps, etc.

Accordingly, as can also be seen in FIG. 9, the portion of the primary lateral restraint 32 that lies between the end 33 and the point of attachment 35 defines a loop 39. In addition, the portion of the primary lateral restraint 32 that lies between the end 34 and the point of attachment 35 defines another loop 40. As discussed below, the loops 39 and 40, respectively, of the embodiment of the restraint harness 10 depicted herein have been sized to fit the design of the tow bar apparatus 50 depicted in the Figures. However, it will also be understood that, in other embodiments of the present invention, the loops 39 and 40, respectively, may be sized to accommodate the particular tow bar apparatus with which the restraint harness of the present invention is to be used.

The secondary lateral restraint 42 includes an elongate strap fabricated from a flexible material such as the polyester webbing mentioned above with regard to the construction of the longitudinal load strap 12. However it will be appreciated by the skilled craftsman that other materials having similar characteristics may be utilized in the design of the secondary lateral restraint 42. As shown in FIG. 1, the secondary lateral restraint 42 is affixed to the upper section 13 of the longitudinal load strap 12 between the primary anchor 18 and the primary lateral restraint 32 by means of stitching, adhesive, lamination, or other suitable method of attachment 46 such that the length of the secondary lateral restraint 42 is oriented perpendicular to the length of the longitudinal load strap 12. It will be appreciated that the placement of the secondary lateral restraint 42 along the length of the longitudinal load strap 12 has been chosen to accommodate the particular design of the tow bar apparatus 50 for which the restraint harness 10 has been designed. However, it will further be appreciated that the secondary lateral restraint 42 may be adjusted to suit the particular tow bar apparatus with which the restraint harness of the present invention is to be used.

As shown in FIGS. 1–13, the secondary lateral restraint 42 further includes corresponding sections of hook and loop fastener material 44 and 48 that are stitched to opposite facing sides of the secondary lateral restraint 42. As discussed above, the fastener material 44 and 48 may be sewn to the secondary lateral restraint 42 with 0.0045 inch polyester thread having a rated tensile strength of 85 pounds (generally indicated as 45 and 49). However, other threads and methods of attachment may be employed. Accordingly, the section of hook and loop fastener 44 may be joined to the corresponding section of hook and loop fastener 48 and the secondary lateral restraint 42 thereby formed into a loop having an adjustable length. However, it will be understood by those of ordinary skill in the art that alternate apparatus are available for forming the secondary lateral restraint 42 into a loop having an adjustable length, such as clips, clamps, snaps, and the like.

As noted above, the embodiment of the restraint harness 10 depicted in the Figures is particularly well-suited for use in connection with an aircraft tow bar apparatus 50 having a shear pin tension release mechanism 70. An example of an embodiment of such an aircraft tow bar apparatus is shown in FIGS. 14–18. The tow bar apparatus 50 generally includes a tow bar 60 having a lunette eye 62, wheels 64, and a shear pin tension release mechanism 70. The lunette eye 62 is affixed to one end of the tow bar 60. The lunette eye 62 has an inner diameter sized to accept a standard pintel hook 63 as used on a standard aircraft tow vehicle 51. Accordingly, it will be understood by one of ordinary skill in the art that the tow bar apparatus 50 may be attached to a tow vehicle 51 by means of fitting the pintel hook 63 into the lunette eye 62. However, it will be understood that alternate means of attaching the tow bar apparatus 50 to the tow vehicle 51 are known in the art and are accommodated by the present invention. The wheels 64 are rotatably attached along the length of the tow bar 60. Accordingly, it will further be understood that the tow bar apparatus 50 may be towed behind the tow vehicle 51 on wheels 64.

Figure 15:
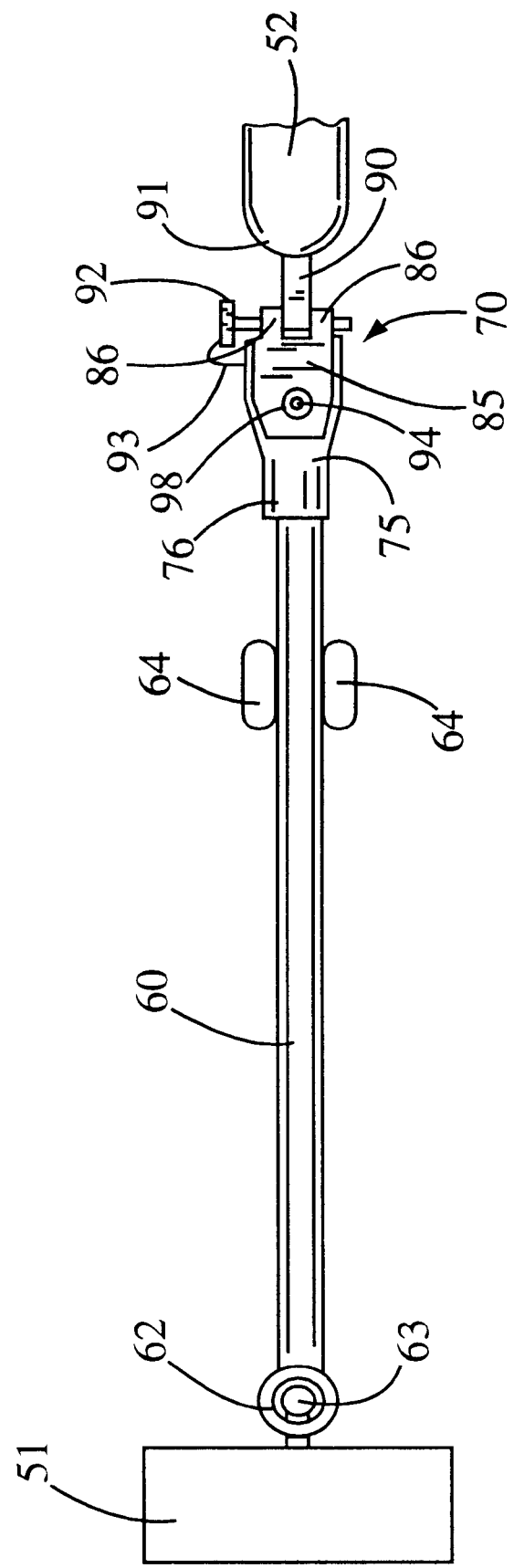
FIG. 15 is a top view of the aircraft tow bar apparatus of FIG. 14 attached to a tow vehicle.

As shown in FIG. 15, the shear pin tension release mechanism 70 is affixed to the end of the tow bar 60 opposite the lunette eye 62. The shear pin tension release mechanism 70 generally includes a tow bar fitting 75 and a tow bar clevis 85 releasably joined by a shear pin 94. The tow bar fitting 75 forms a cuff 76 that is sized to accept the tow bar 60 therein and to thereby fixedly join the tow bar fitting 75 to the tow bar 60. The tow bar clevis 85 includes a pair of arms 86 each having a corresponding hole 88 therethrough. See FIG. 16. The arms 86 are spaced to accept a hitch 90 therebetween. The hitch 90 has a through bore (not shown) extending therethrough. The hitch 90 is placed between the arms 86 and holes 88 and the bore aligned to accept a pin 92 therethrough to releasably join the tow bar 60 and the nose gear 91. As depicted herein, the pin 92 is attached to the clevis 85 by a cable 93 to prevent it from becoming lost when it has been removed from the clevis. In addition, the pin 92 depicted herein is provided with a ball lock mechanism 96 of known design at the end thereof to aid in maintaining the pin 92 in place within the holes 88 when the tow bar 60 is in use.

Figure 16:
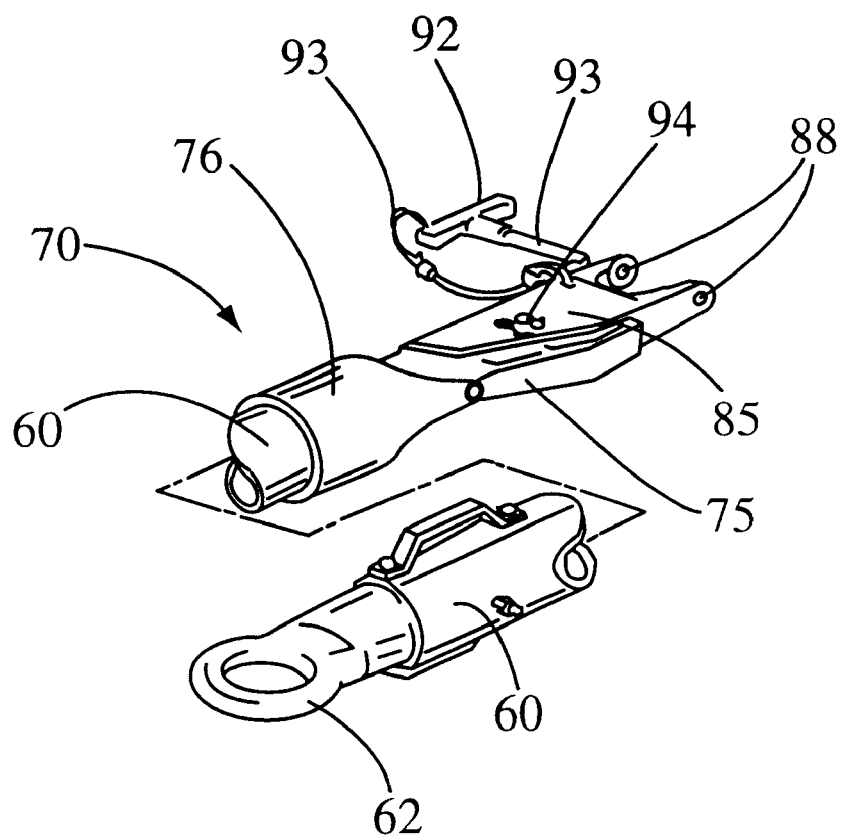
FIG. 16 is an exploded view of the shear-pin tension release mechanism of the aircraft tow bar apparatus of FIG. 14.

As shown in FIGS. 15 and 16, the tow bar fitting 75 and the tow bar clevis 85 are held in a fixed relation with each other by way of a shear pin 94. The fitting 75 is inserted within the clevis 85. When the fitting 75 is inserted within the clevis 85, a pair of corresponding bores (not shown) in the clevis 85 and fitting 75, respectively, align to form a bore 98. See FIG. 18. The shear pin 94 is inserted through the bore 98, thus releasably joining the fitting 75 to the clevis 85. In addition, as shown in the Figures, the shear pin 94 may be adapted to accept cotter pins 95 at either end in a conventional manner.

The shear pin 94 is selected with a predetermined shear strength. In this embodiment, the shear pin 94 manufactured from 7075-T6 aluminum alloy having a diameter of 0.220 inches and is rated to withstand a double shear force of 3900 pounds before shearing. However, the pin 92 described above is selected to have a predetermined shear strength greater than that of the shear pin 94. In this embodiment, the pin 92 is rated to withstand a shear force of at least 8000 pounds. Accordingly, it will be appreciated that the shear pin 94 is designed to shear before the pin 92. When the shear pin 94 shears, the clevis 85 is separated from the fitting 75 and the UAV 52 thus separates from the tow bar apparatus 50. Accordingly, any tension on the tow bar apparatus 50, the tow vehicle 51, and the UAV 52 is relieved and the UAV 52 is placed in a free rolling condition. As described above, this free rolling condition is undesirable. However, when the restraint harness 10 of the present invention is in place on the tow bar apparatus 50 as described below, the UAV 52 is maintained in connection with the tow bar apparatus 50, even after pin shear has occurred, thus preventing the UAV 52 from being placed in a free rolling condition and providing time for the operator of the tow vehicle 51 to slow the UAV 52 to a stop and replace the shear pin 94. In addition, it will be appreciated that the restraint harness 10 of the present invention will itself be placed under tension and experience visible stretching when pin shear occurs. This stretching will serve as an additional cue to the tow vehicle operator that pin shear has occurred and that the tow vehicle 51 should be brought to a stop. It will farther be appreciated that the tow bar fitting 75 may be marked with various colors and/or patterns to further enhance the effectiveness of this visual cue.

Figure 17:
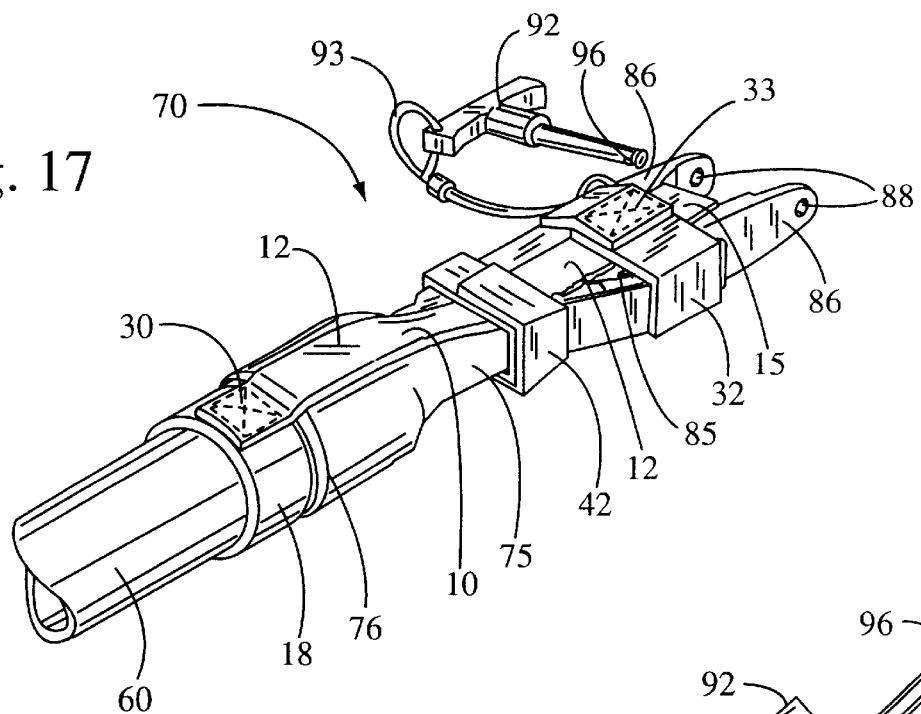
FIG. 17 is an isometric view of the shear-pin tension release mechanism of the aircraft tow bar apparatus of FIG. 16, having the restraint harness of FIG. 1 installed thereon.
Figure 18:
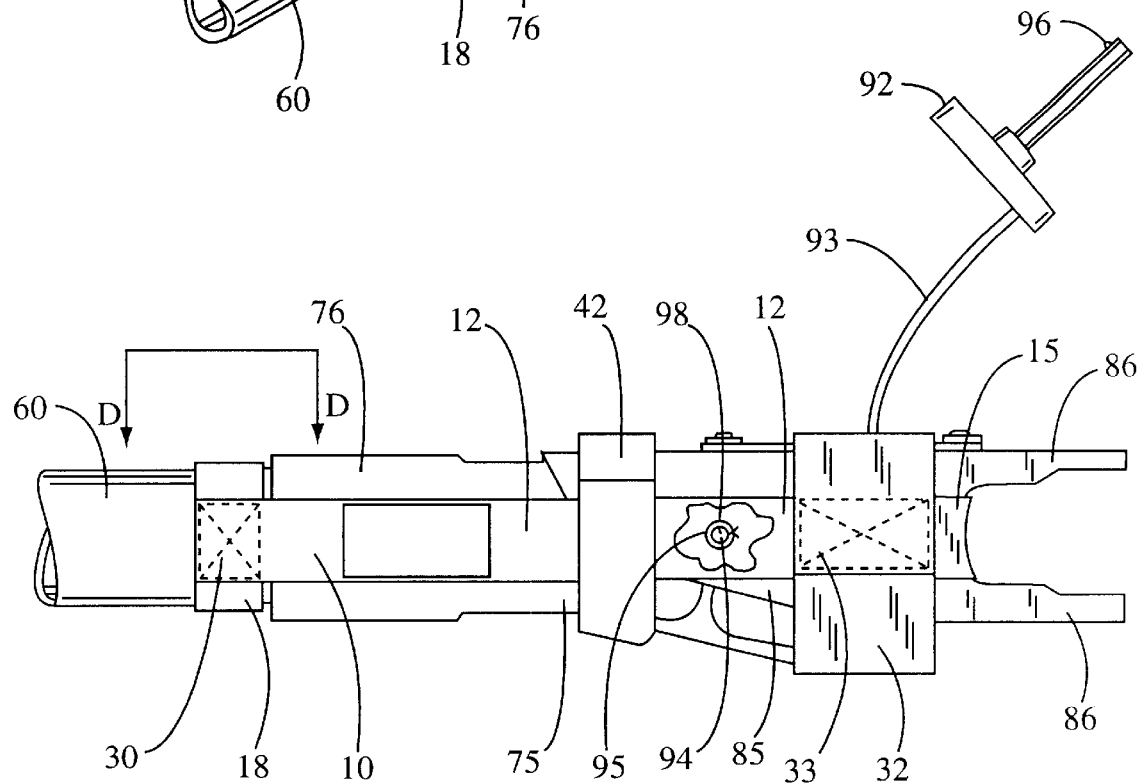
FIG. 18 is a top view of the shear-pin release mechanism of the aircraft tow bar apparatus of FIG. 16, having the restraint harness of FIG. 1 installed thereon with a portion of the longitudinal load strap removed to show the placement of the shear pin therein.

As shown in FIGS. 17–19, in operation, the embodiment of the restraint harness 10 described herein is attached to the tow bar 60 about the shear pin tension release mechanism 70. In particular, the restraint harness 10 is prepared for attachment to the tow bar 60 by detaching the hook and loop fastener 44 and 48 of the secondary lateral restraint 42 and detaching the end 20 of the primary anchor 18 from the buckle 21. The tow bar 60 is itself prepared for attachment of the restraint harness 10 by removing the pin 92 from the tow bar clevis 85.

The restraint harness 10 is then placed over the shear pin tension release mechanism 70 in the position illustrated in FIGS. 17–19. In such a configuration, the upper portion 13 of the longitudinal load strap 12 will lie atop the shear pin tension release mechanism 70 aligned with the length of the tow bar 60 and the lower portion 14 of the longitudinal load strap 12 will lie above and below the shear pin tension release mechanism 70 aligned with the length of the tow bar 60. The primary lateral restraint 32 will be oriented adjacent to the point of connection between the tow bar fitting 75 and the tow bar clevis 85. The primary lateral restraint 32 is thus wrapped around the tow bar clevis 85 and tow bar fitting 75. The secondary lateral restraint 42 is wrapped around the tow bar fitting 75 and fixed in place using the corresponding pieces of hook and loop material 44 and 48, as described above. The primary anchor 18 is aligned with the portion of the tow bar 60 adjacent to the cuff 76 of the tow bar fitting 75. The primary anchor 18 is thus wrapped about the tow bar 60 adjacent to the cuff 76 of the tow bar fitting 75 to form a loop and the end 20 is fastened to the buckle 21 using the locking pin 24, as described above. In this example, each of the primary anchor 18, primary lateral restraint 32, and secondary lateral restraint 42 are tightly fixed in their respective positions. The tow bar 60 may then be re-attached to the nose gear 91 of a UAV 52 by aligning the eyelets 88 of the clevis 85 with the bore (not shown) of the hitch 90 and inserting the pin 92 therein in the manner described above.

Figure 20:
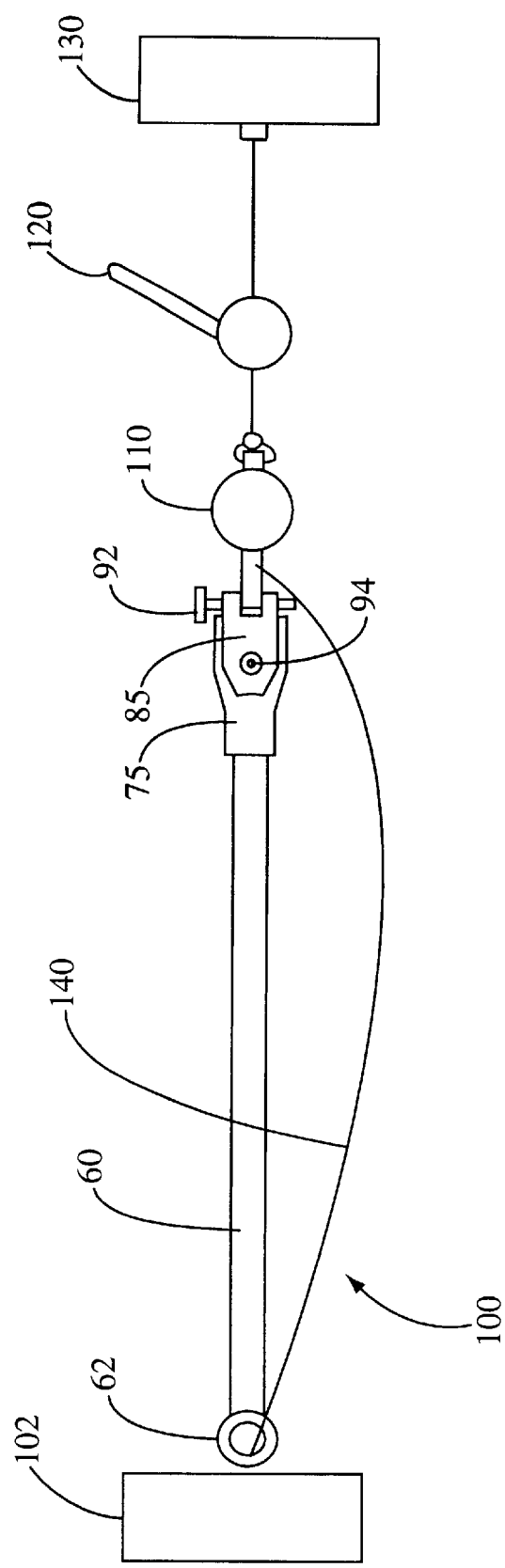
FIG. 20 is a top view of the aircraft tow bar apparatus of FIG. 14 attached to a test apparatus.

In a test scenario designed to simulate shearing of the shear pin 94 when the tow bar 60 is being used to tow a UAV 52, the restraint harness 10 of the present invention proved successful in sufficiently maintaining the integrity of the connection between the tow bar fitting 75 and the tow bar clevis 85 after pin shear had occurred to allow a tow tractor operator to bring the UAV 52 to a safe and orderly stop. The test apparatus 100 used to perform the test scenario is shown in particular in FIG. 20. The test apparatus 100 generally includes a tow bar 60 mounted between immovable objects 102 and 130, and a load cell 110 and a come-along 120 mounted in sequence therewith. In particular, the tow bar 60 was anchored to the immovable object 102. The immovable object 102 may be an object having a mass sufficient to make it immovable under the forces exerted upon it during the course of the test scenario. The restraint harness 10 is placed over the tow bar 60 and attached thereto, as described above. The load cell 110 is secured to the tow bar clevis 85 using the ball lock pin 92 provided with the tow bar 60 such that the load cell 110 may accurately monitor the tension forces being placed on the tow bar 60 during the course of the test scenario. The other side of the load cell 110 is attached to the come-along 120 which itself is anchored to the other immovable object 130. The immovable object 130 may be any object having a mass sufficient to make it immovable under the forces exerted upon it during the course of the test scenario. The come-along 120 is adapted to selectively increase and decrease the tension placed on the tow bar 60. For purposes of the test scenario, a safety line 140 may also be secured between the load cell 10 and the object 100. The safety line 140 is intended to protect the individuals performing the test scenario from debris in the event that a catastrophic tow bar failure occurs. In addition, a visible line may be applied to the tow bar fitting 75 to indicate the range of displacement of the tow bar 60 that results when the shear pin 94 shears.

The test scenario is typically conducted as follows. After the restraint harness 10 is secured in place on the tow bar 60, as described above, the come-along 120 is used to impart variable loads to the tow bar 60. In particular, the come-along 120 is used to steadily increase the load on the tow bar 60 until it is noted that the restraint harness 10 displays visible evidence of loading without an audible indication of the shear pin 94 experiencing shear. In the embodiment described above, this condition is achieved when the load cell 110 indicates that the load placed on the tow bar 60 has reached 3600 pounds. At this tension level, the shear pin 94 is placed in a condition of pre-shear bending in which the restraint harness 10 is observed to visibly stretch prior to pin shear. Accordingly, in such a condition, the shear pin 94 has not yet experienced shear and the tow bar clevis 85 remains adequately attached to the tow bar fitting 75 by the shear pin 94. The come-along 120 is then used to remove the tension being placed on the tow bar 60 and the shear pin 94 is checked to verify that the pin shear has indeed not occurred. From this unloaded condition the come-along 120 is again used to steadily increase the load on the tow bar 60 until pin shear occurs. In the embodiment described above, pin shear will occur at a load of approximately 3900 pounds. Pin shear generally results in a loud audible report. After the destruction of the shear pin 94 the come-along 120 is used to further increase the load on the tow bar 60 until the load cell 10 indicates that a load of 4250 pounds is being placed on the tow bar 60. At this load level, the restraint harness 10 has exhibited sufficient tensile strength to hold the towbar fitting 75 and tow bar clevis 85 together while experiencing approximately 1 inch of longitudinal displacement and no lateral displacement. The come-along 120 is then used to release the tension placed on the tow bar 60 and the restraint harness 10 removed from the tow bar 60.

As can be appreciated from the above description of the restraint-harness 10 and the test scenario performed thereon, the restraint harness 10 of the present invention is capable of maintaining the integrity of the tow bar 60 after pin shear has occurred and thus provides distinct advantages over conventional designs. In particular, the restraint harness 10 is anchored to the tow bar fitting 75 by the primary and secondary lateral restraints 32 and 42, respectively, and anchored to the tow bar clevis 85 by the primary anchor 18 and closed end portion 15. Accordingly, in the case that the shear pin 94 shears and thus ceases to connect the tow bar fitting 75 to the tow bar clevis 85. The restraint harness 10 will be subject to a tensile force as the tow bar fitting 75 and tow bar clevis 85 are pulled in opposite directions. The tensile force exerted on the restraint harness 10 will cause the restraint harness 10 to undergo visible stretching. However, the restraint harness 10 described herein exhibits sufficient tensile strength to maintain the integrity of the connection between the tow bar fitting 75 and the tow bar clevis 85. In particular, the integrity of the connection maintained by the restraint harness 10 is sufficient to maintain the integrity of the tow bar 60 in directions both lateral and parallel to the tension being placed on the tow bar 60 by the UAV 52. The visible stretching of the restraint harness 10 will serve as an indicator to the operator of the tow vehicle 51 that pin shear has occurred. Thus, the UAV 52 being towed by the tow bar apparatus 50 may be maintained in control by the tow bar 60 until it is brought to a safe stop. Therefore, the tow bar 60 outfitted with the present invention represents an advancement over the existing art. Those of ordinary skill in the art will, of course, appreciate that various changes in the details, materials, and arrangement of parts Which have been herein described and illustrated in order to explain the nature of the invention may be made by the skilled artisan within the principle and scope of the invention as expressed in the appended claims.

What is claimed is:

1. A restraint harness comprising:
   a longitudinal load strap having a length and a width defining an upper surface, a lower surface, a closed end, and an open end;
   a primary anchor fixedly connected to said upper and lower surfaces adjacent to said open end;
   a primary lateral restraint fixedly connected to said upper and lower surfaces adjacent to said closed end; and
   a secondary lateral restraint fixedly connected to said upper surface between said primary anchor and said primary lateral restraint.

2. The restraint harness of claim 1, wherein said longitudinal load strap is fabricated from an elongate flexible strap.

3. The restraint harness of claim 1, wherein said primary anchor is formed from an elongate flexible strap fixedly connected perpendicular to the length of said longitudinal load strap and further comprises:
   a first end having a buckle formed from a rigid material fixed thereon, said buckle having at least one aperture therein; and a second end sized to fit within said at least one aperture to form said primary anchor into an adjustable loop and having at least one slot therein.

4. The restraint harness of claim 3, further comprising a pin having a length, said pin sized to be inserted into said at least one slot, the length of said pin greater than that of said aperture.

5. The restraint harness of claim 3, wherein said primary anchor is fabricated from an elongate flexible strap.

6. The restraint harness of claim 1, wherein said primary lateral restraint further comprises an elongate flexible strap having a first end and a second end, said primary lateral restraint fixedly connected to said upper surface at said first and second ends and fixedly connected to said lower surface at a point between said first and second ends.

7. The restraint harness of claim 6, wherein said primary lateral restraint is fabricated from an elongate flexible strap.

8. The restraint harness of claim 1, wherein said secondary lateral restraint further comprises a first end and a second end, said secondary lateral restraint fixedly connected at said first end perpendicular to the length of said longitudinal load strap and said second end releasable joined to said first end by a fastener.

9. The restraint harness of claim 8, wherein said fastener further comprises a first hook and loop fastener affixed to said first end of said secondary lateral restraint and a second hook and loop fastener corresponding to said first hook and loop fastener affixed to said second end of said secondary lateral restraint.

10. The restraint harness of claim 9, wherein said secondary lateral restraint is fabricated from an elongate flexible strap.

11. A restraint harness for retaining a first tow bar portion in attachment with a second tow bar portion that was formerly attached to the first tow bar portion by a shear pin wherein pin shear has occurred, said restraint harness comprising a longitudinal load strap member sized to bridge a point of connection between the first and second tow bar portions, said longitudinal load strap member having a first end portion attached to the first tow bar portion and a primary anchor portion attached to the second tow bar portion.

12. The restraint harness of claim 11, wherein the first tow bar portion includes a clevis having spaced legs and wherein said first end portion of said longitudinal load strap member comprises a closed loop extending between the legs of the clevis.

13. The restraint harness of claim 11, wherein said primary anchor portion includes an elongate flexible strap fixedly connected to said longitudinal load strap member perpendicular to the length thereof and wherein said primary anchor portion further comprises:

a first end having a buckle formed from a rigid material fixed thereon, said buckle having at least one aperture therein; and a second end having at least one slot therein and sized to fit within and frictionally engage said at least one aperture to form said primary anchor into an adjustable loop.

14. The restraint harness of claim 13, further comprising a pin having a length, said pin sized to be inserted into said at least one slot, the length of said pin greater than that of said aperture.

15. The restraint harness of claim 11, further comprising a primary lateral restraint attached to said longitudinal load strap member adjacent said first end portion thereof.

16. The restraint harness of claim 15, wherein said primary lateral restraint member comprises a flexible strap affixed to said longitudinal load strap adjacent to said first end portion thereof, said flexible strap sized to fit around a portion of the first tow bar portion and be secured thereto.

17. The restraint harness of claim 15, further comprising a secondary lateral restraint portion affixed to said longitudinal load strap member between said primary lateral restraint portion and said primary anchor portion.

18. The restraint harness of claim 15, wherein said primary lateral restraint further comprises an elongate flexible strap having a first end and a second end, said primary lateral restraint fixedly connected to an upper surface of said longitudinal load strap adjacent to said first and second ends and fixedly connected to a lower surface of said longitudinal load strap at a point between said first and second ends.

19. The restraint harness of claim 17, wherein said secondary lateral restraint further comprises an elongate flexible strap having a first end and a second end, said secondary lateral restraint fixedly connected at said first end thereof perpendicular said longitudinal load strap and said second end releasably connected to said first end by a fastener.

20. The restraint harness of claim 19, wherein said fastener further comprises a first hook and loop fastener affixed to said first end of said secondary lateral restraint and a second hook and loop fastener corresponding to said first hook and loop fastener affixed to said second end of said secondary lateral restraint.

21. The restraint harness of claim 11, wherein said tow bar is an aircraft tow bar.

22. An aircraft tow bar restraint harness adapted to retain a first tow bar portion attached to an aircraft in attachment with a second tow bar portion attached to a tow vehicle and having a shear pin that formerly attached the first and second tow bar portions together before pin shear occurred and which has a shear pin tension release section including a fitting and a clevis, said tow bar restraint harness comprising:

a longitudinal load strap having a length and a width and defining an upper surface, a lower surface, a closed end, and an open end;

a primary anchor formed from an elongate flexible strap fixedly connected to said upper and lower surfaces adjacent to said open end;

a primary lateral restraint formed from an elongate flexible strap fixedly connected to said upper and lower surfaces adjacent to said closed end; and a secondary lateral restraint formed from an elongate flexible strap fixedly connected to said upper surface at a point between said primary anchor and said primary lateral restraint.

23. The aircraft tow bar restraint harness of claim 22, wherein said closed end defined a loop and wherein said longitudinal load strap is removably anchored to the clevis by said loop and to said fitting by said primary and secondary lateral restraints.

24. The restraint harness of claim 22, wherein said primary anchor is fixedly connected perpendicular to the length of said longitudinal load strap and further comprises:

a first end having a buckle formed from a rigid material fixed thereon, said buckle having at least one aperture therein; and a second end having at least one slot therein and sized to fit within and frictionally engage said at least one aperture thereby forming said primary anchor into a loop sized to fit about said fitting end.

25. The restraint harness of claim 24, further comprising a pin, said pin having a length and sized to be inserted into said at least one slot, the length of said pin greater than that of said aperture.

26. The restraint harness of claim 24, wherein said primary lateral restraint further comprises a first end and a second end, said primary lateral restraint fixedly connected to said upper surface at said first and second ends and to said lower surface at a point between said first and second ends to form said primary lateral restraint into a loop sized to fit about said clevis.

27. The restraint harness of claim 24, wherein said secondary lateral restraint further comprises a first end and a second end, said secondary lateral restraint fixedly connected at said first end perpendicular to the length of said longitudinal load strap and said second end releasable joined to said first end by a fastener to form said secondary lateral restraint into a loop sized to fit about said fitting and said clevis.

28. The restraint harness of claim 27, wherein said fastener further comprises a first hook and loop fastener affixed to said first end of said secondary lateral restraint and a second hook and loop fastener corresponding to said first hook and loop fastener affixed to said second end of said secondary lateral restraint.

29. A restraint harness for retaining a first tow bar portion in attachment with a second tow bar portion that was formerly attached to the first tow bar portion by a shear pin before pin shear occurred, said restraint harness comprising:

a longitudinal load strap sized to bridge a point of connection between said first tow bar portion and said second tow bar portion;

a first attachment means for attaching a first portion of said longitudinal load strap to the first to the first tow bar portion; and a primary attachment means for attaching a second end of said longitudinal load strap to the second tow bar portion.

30. The restraint harness of claim 29, further comprising means attached to said longitudinal load strap for providing lateral support to the first and second tow bar portions after the shear pin no longer attaches the first and second tow bar portions together.

31. A method of maintaining integrity of a tow bar apparatus having a length and a shear pin tension release mechanism including a fitting and a clevis, comprising:

affixing an end of a longitudinal load strap having a first end and a second end in a direction parallel and lateral to the length of the tow bar apparatus; and further affixing another end of the longitudinal load strap to the fitting in a direction parallel and lateral to the length of the tow bar.

32. The method of claim 31 wherein said affixing comprises:

forming at least one loop in the first end of the longitudinal load strap; and hooking the end of the clevis through the loop.

33. The method of claim 31, wherein said further affixing comprises:

fixedly connecting a primary strap to the second end of the longitudinal load strap;

wrapping the primary strap around the fitting; and securing the strap around the fitting.

* * * * *